H. H. WEST.
CIRCULAR KNITTING MACHINE.
APPLICATION FILED DEC. 21, 1908.
953,248.
Patented Mar. 29, 1910.
10 SHEETS—SHEET 1.
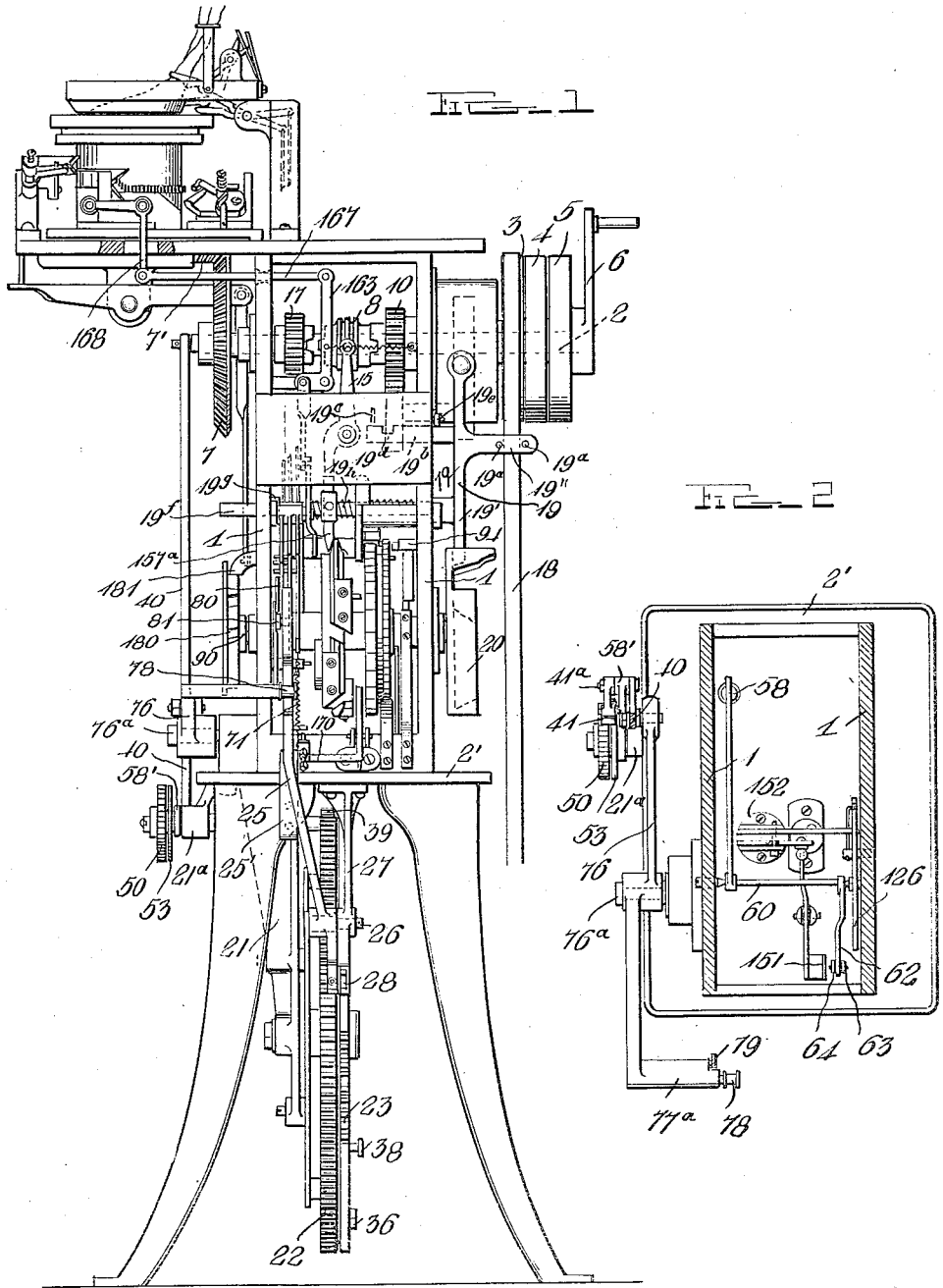
Witnesses
Inventor
Harry H. West
Attorneys

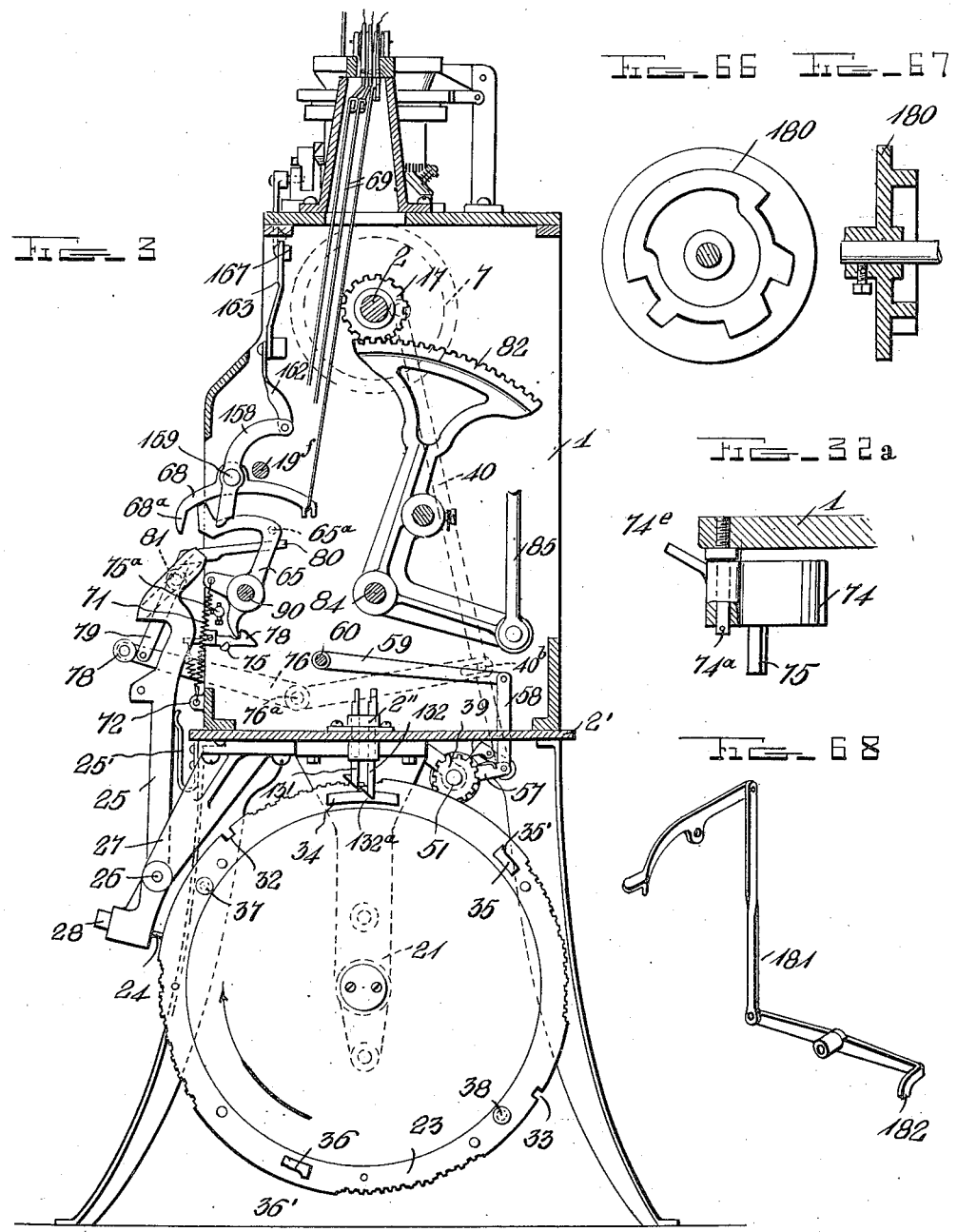

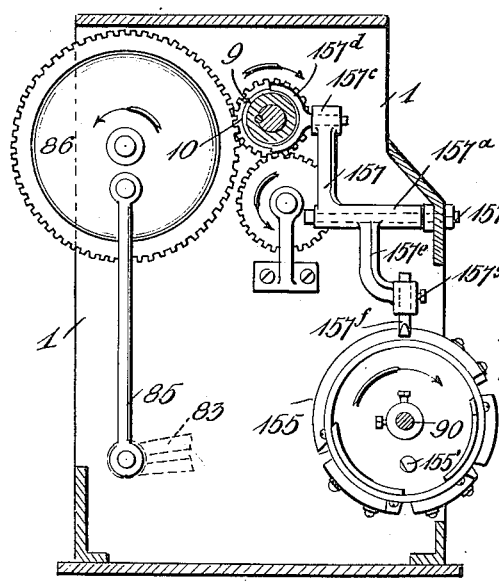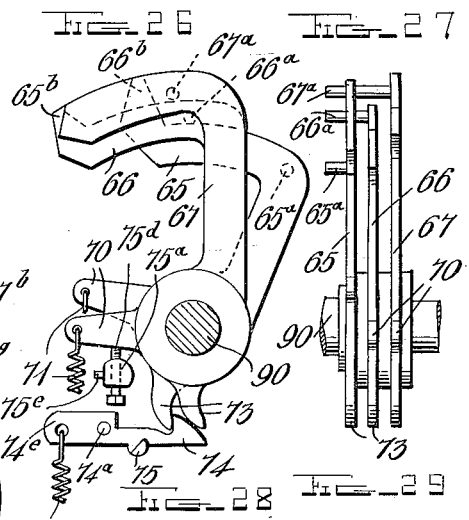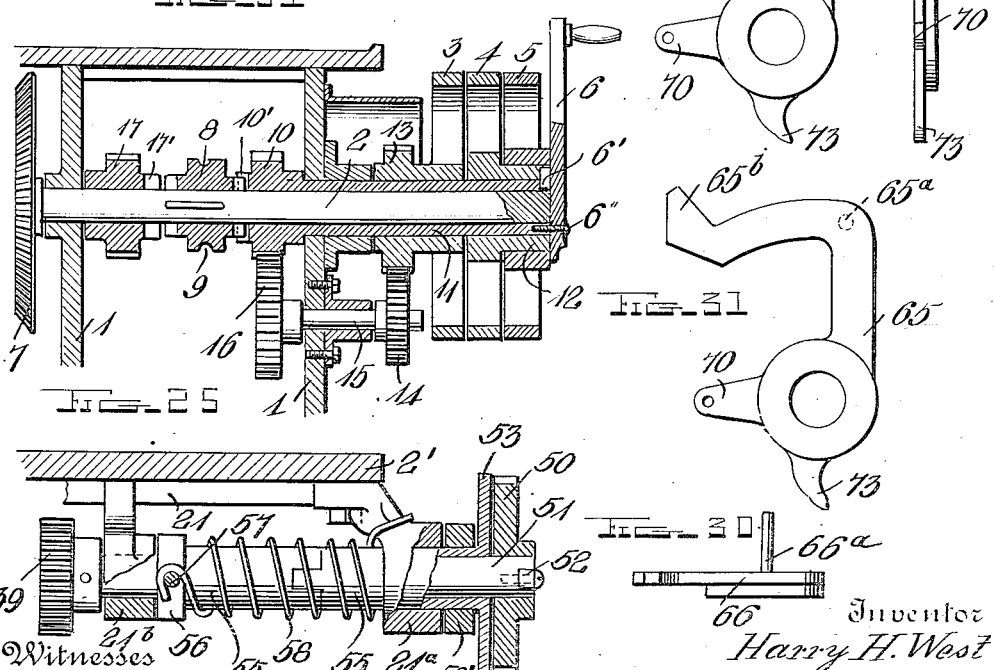

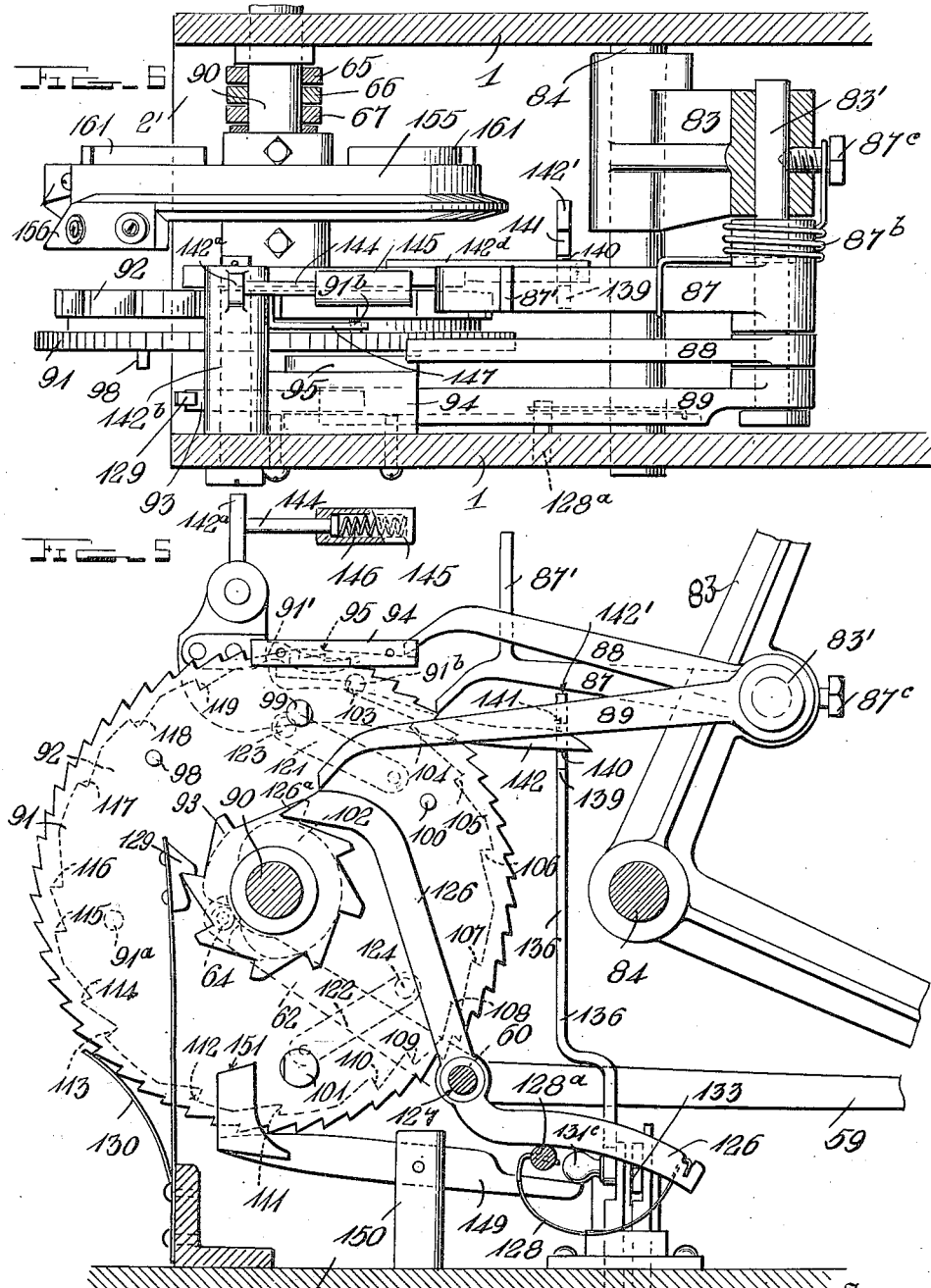

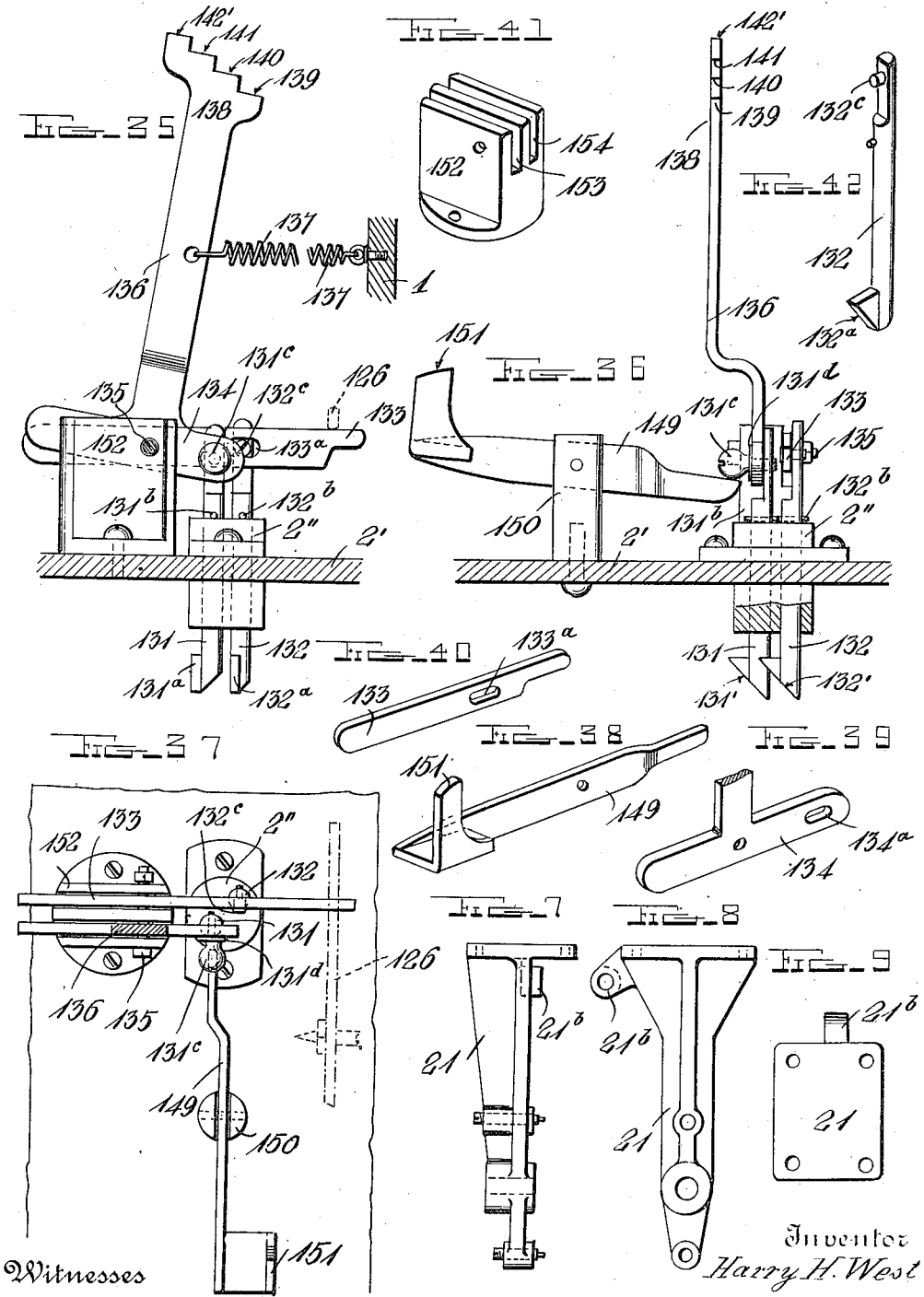

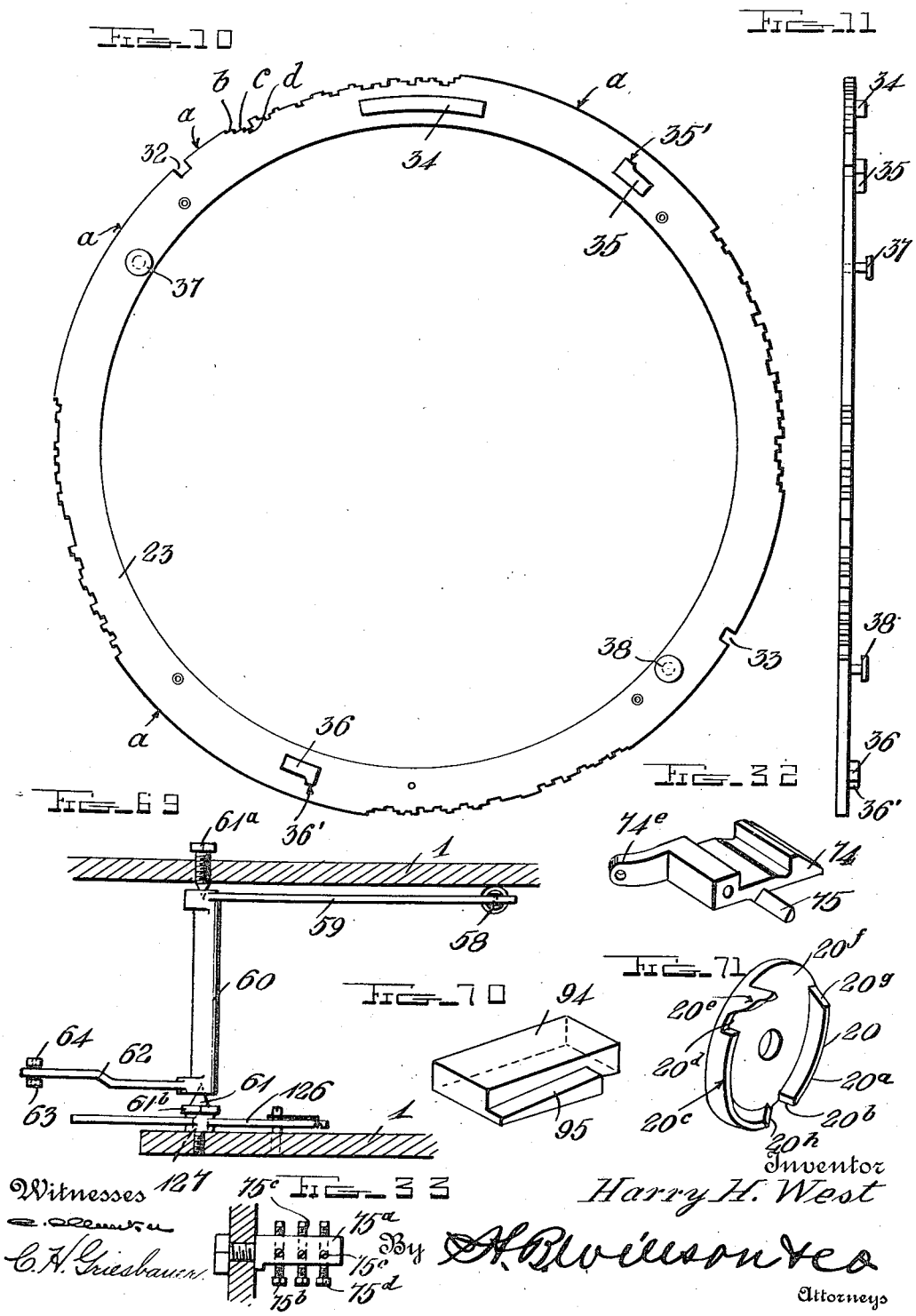

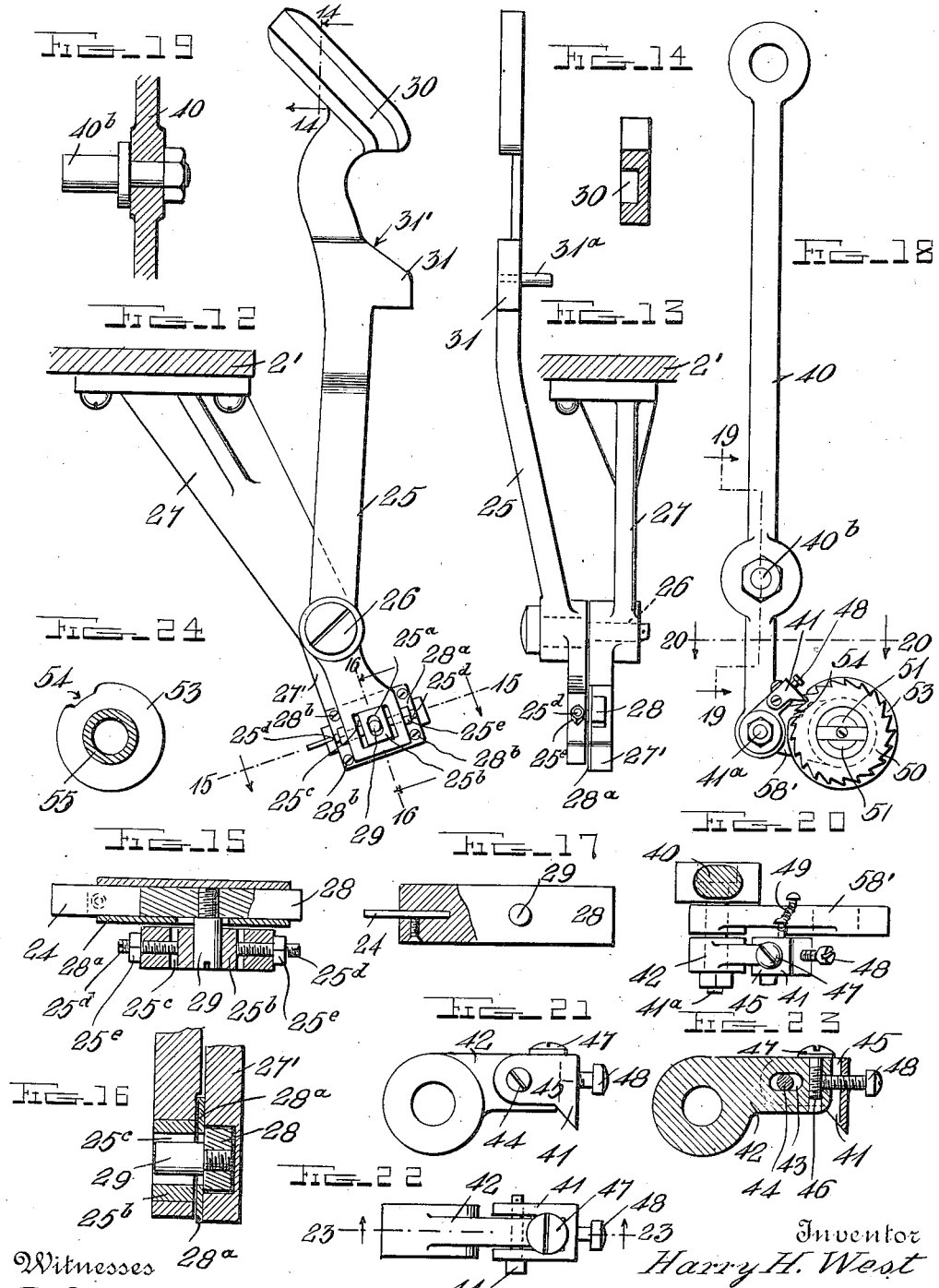

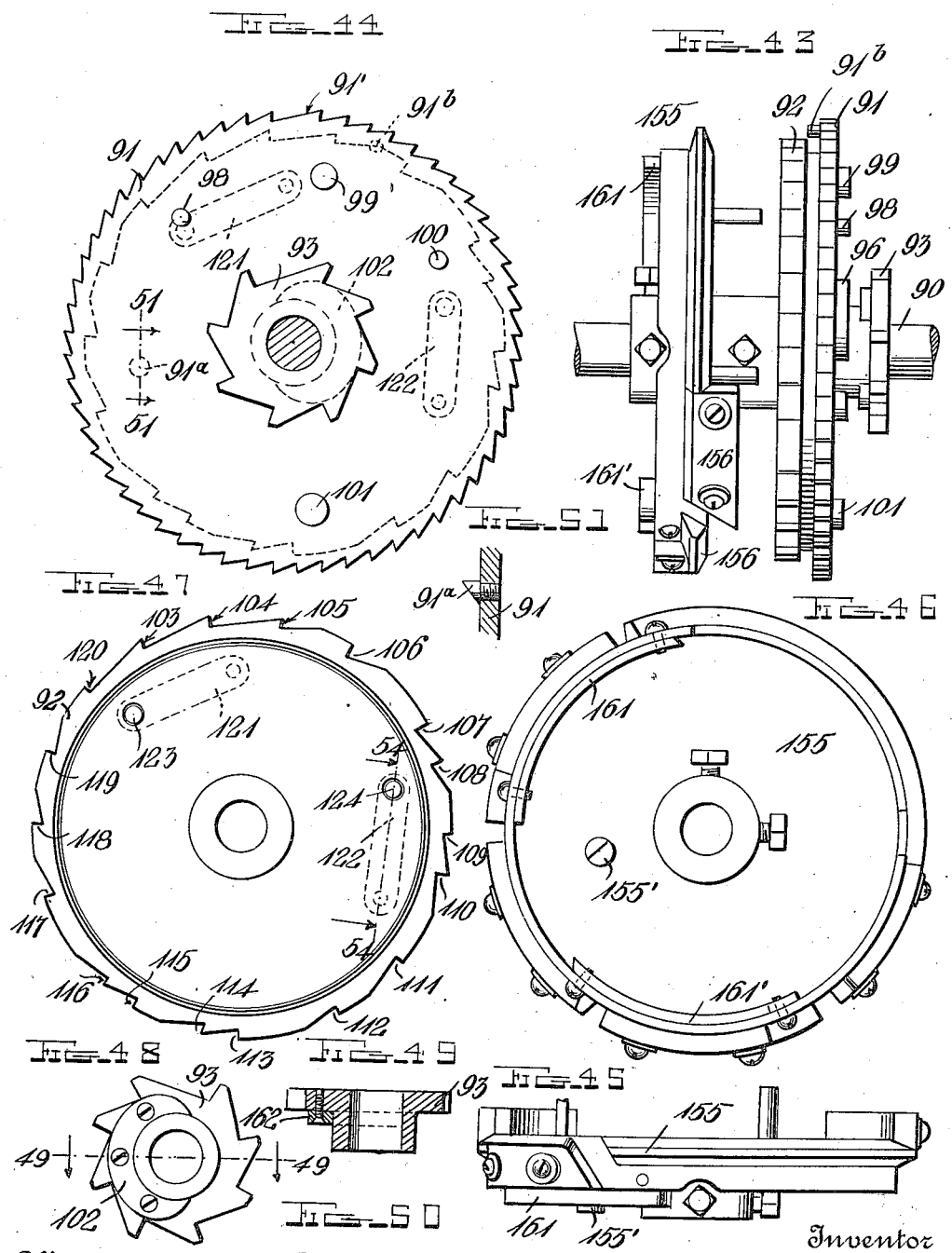

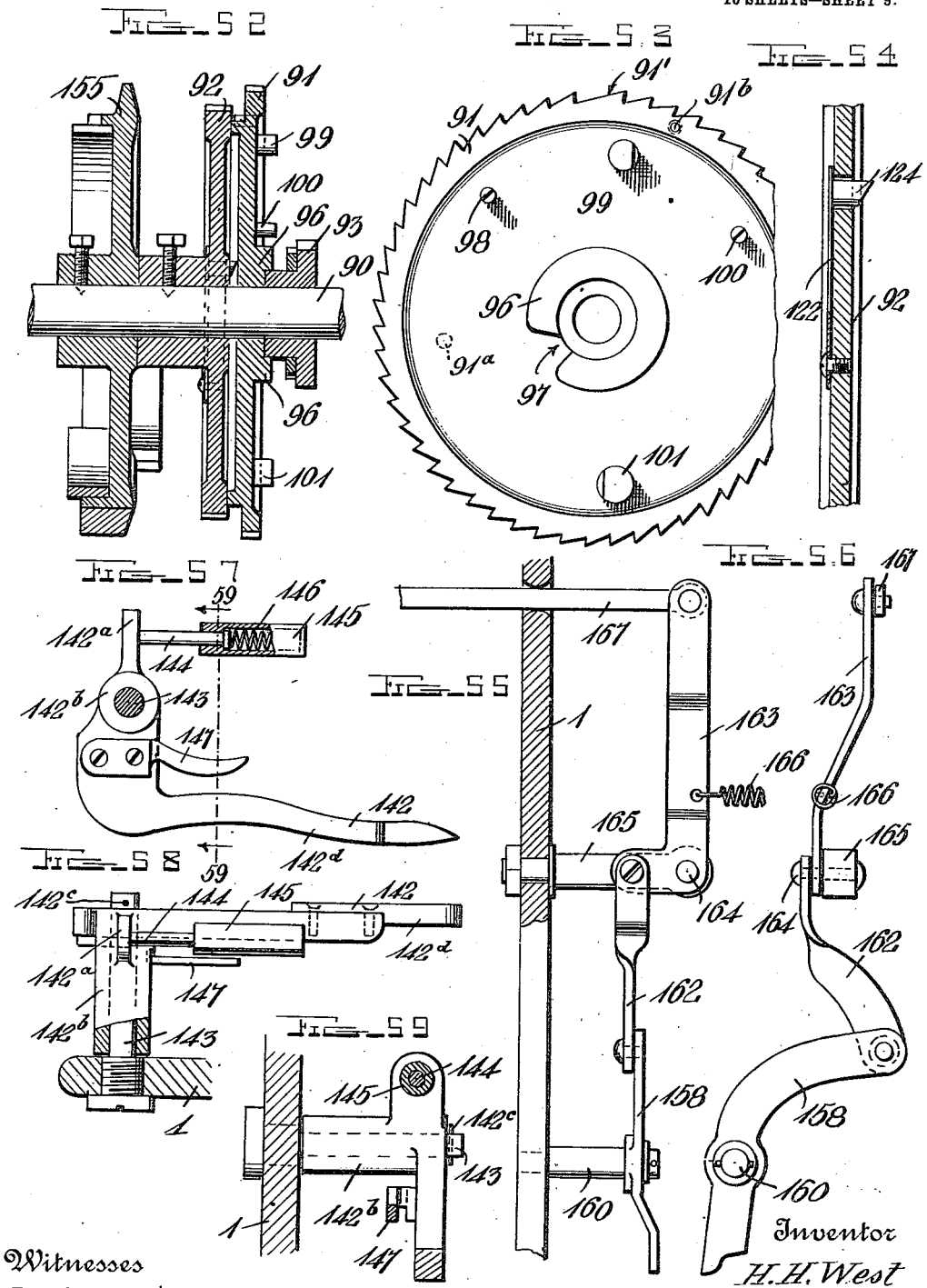

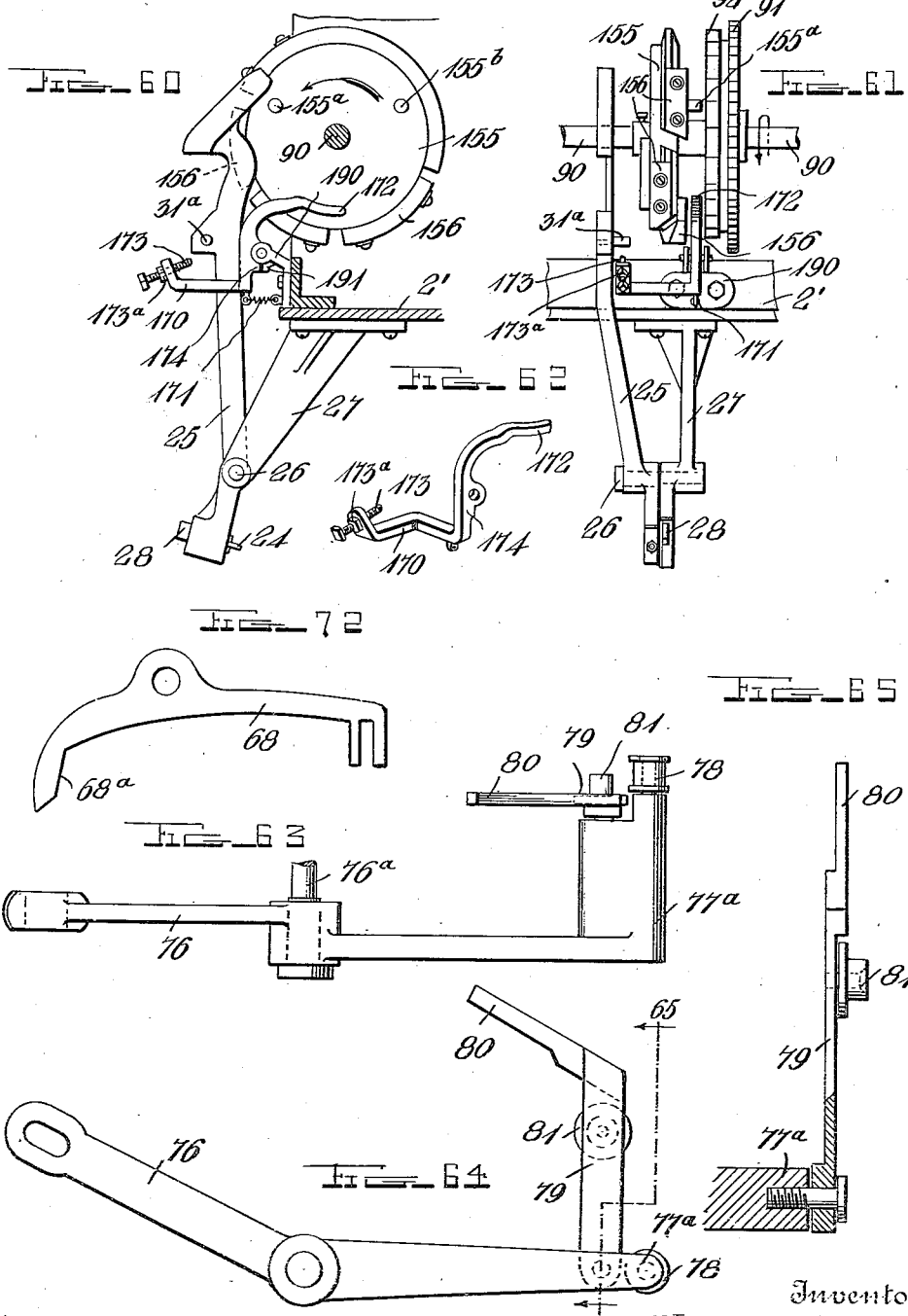

UNITED STATES PATENT OFFICE.

HARRY H. WEST, OF PLYMOUTH, PENNSYLVANIA.

CIRCULAR-KNITTING MACHINE.

953,248.  Specification of Letters Patent.  Patented Mar. 29, 1910.

Application filed December 21, 1908. Serial No. 468,578.

*To all whom it may concern:*

Be it known that I, HARRY H. WEST, a citizen of the United States, residing at Plymouth, in the county of Luzerne and State of Pennsylvania, have invented certain new and useful Improvements in Circular-Knitting Machines; and I do declare the following to be a full, clear, and exact description of the invention, such as will enable others skilled in the art to which it appertains to make and use the same.

This invention relates to circular knitting machines adapted to knit complete seamless and striped stockings with heel and toe tips composed of a different yarn and in which all the operations are accomplished automatically.

The object of the invention is to provide simple and efficient means for operating the yarn changers by means of which the thread can be accurately changed to obtain any desired pattern.

With these and other objects in view, the invention consists of certain novel features of construction, combination and arrangement of parts as will be more fully described and particularly pointed out in the appended claims.

In the accompanying drawings, Figure 1 is a front elevation of a complete machine showing these improvements embodied therein; Fig. 2 is a horizontal section disclosing the parts mounted on the base of the machine; Fig. 3 is a vertical section taken through the machine in front of the segmental gear; Fig. 4 is a vertical section through the machine taken in front of the cam drum; Fig. 5 is an enlarged detail vertical sectional view taken through the operating wheels and adjacent parts; Fig. 6 is a plan view, with parts in section; Fig. 7 is a detail front elevation of the bracket which supports the pattern wheel; Fig. 8 is a side elevation of said bracket; Fig. 9 is a plan view thereof; Fig. 10 is a detail side elevation of the pattern ring on an enlarged scale; Fig. 11 is an edge view thereof; Fig. 12 is a detail side elevation of an enlarged scale of the pattern controlled operating lever for the yarn changers; Fig. 13 is a front elevation of said lever; Fig. 14 is a transverse section taken on the line 14—14 of Fig. 12; Fig. 15 is a horizontal sectional view, on line 15—15 of Fig. 12; Fig. 16 is a vertical section taken on line 16—16 of Fig. 12; Fig. 17 is a detail side elevation, partly in section, of the block carrying the pattern engaging pin; Fig. 18 is a side elevation of the pitman and adjacent parts; Fig. 19 is a detail sectional view taken on the line 19—19 of Fig. 18; Fig. 20 is a horizontal sectional view on the line 20—20 of Fig. 18; Fig. 21 is a detail side elevation of the pawl; Fig. 22 is a plan view thereof; Fig. 23 is a longitudinal section taken on the line 23—23 of Fig. 22; Fig. 24 is a detail sectional view showing the guard disk in side elevation; Fig. 25 is a detail side elevation, partly in section, of the pattern ring operating mechanism; Figs. 26, 27, 28, 29, 30 and 31 are detail views of the levers for operating the yarn changers; Fig. 32 is a detail perspective view of the retaining pawl for the yarn changing levers; Fig. 32$^a$ is a detail horizontal sectional view through the housing showing the pivotal mounting of said retaining pawl; Fig. 33 is a detail side elevation of the stop carrying bar for the yarn changer levers; Fig. 34 is a detail longitudinal sectional view of the main driving shaft and the parts carried thereby; Fig. 35 is a sectional view through the base of the machine disclosing the parts operated upon by the cams and studs on the pattern ring; Fig. 36 is a similar view taken at right angles to Fig. 35; Fig. 37 is a plan view thereof; Fig. 38 is a detail perspective view of the operating lever engaged by the studs on one of the operating wheels; Fig. 39 is a detail perspective view of the lower end of the upright lever shown in Fig. 35; Fig. 40 is a detail perspective view of the lever operated upon by the studs on the cam wheel; Fig. 41 is a detail perspective view of the block in which the levers shown in Figs. 35 and 36 are mounted; Fig. 42 is a detail perspective view of the pawl member operated upon by the studs on the cam ring; Fig. 43 is a side elevation of the operating wheels and the cam drum; Fig. 44 is an end elevation looking in the direction of the arrow in Fig. 43; Fig. 45 is a detail edge view of the clutch operating cam drum; Fig. 46 is a side elevation thereof; Fig. 47 is a detail side elevation of one of the operating wheels detached; Fig. 48 is a detail side elevation of the ratchet wheel for throwing in additional courses; Fig. 49 is a detail sectional view taken on line 49—49 of Fig. 48; Fig. 50 is a side elevation of the cam shown in Fig. 48 detached; Fig. 51 is a detail vertical sectional view on line 51—51 of Fig. 44; Fig. 52 is a vertical longitudinal sectional view taken through the operating wheels and the cam drum; Fig. 53 is a side elevation of one of the operating wheels with parts broken out; Fig. 54 is a detail sectional view taken on the line 54—54 of Fig. 47; Figs. 55 and 56 are detail views of the mechanism employed for raising the cam guards; Fig. 57 is a side elevation, partly in section, of the lever employed in connection with the feeding pawls; Fig. 58 is a plan view thereof; Fig. 59 is a detail vertical sectional view taken on line 59—59 of Fig. 57; Fig. 60 is a detail vertical sectional view disclosing the means for throwing the tip in and out; Fig. 61 is a front view thereof; Fig. 62 is a detail perspective view of the levers shown in Figs. 60 and 61; Fig. 63 is a plan view of the link operating the pins on the yarn changing levers; Fig. 64 is a side elevation thereof; Fig. 65 is a detail sectional view on line 65—65 of Fig. 64; Fig. 66 is a detail side elevation of the cam disk for operating the pickers; Fig. 67 is a vertical sectional view thereof; Fig. 68 is a detail perspective view of the levers operated upon by the disk shown in Fig. 66; Fig. 69 is a detail horizontal sectional view through a portion of the housing disclosing the mechanism acted upon by the cams on the operating wheels; Fig. 70 is a detail perspective view of the block employed in connection with one of the feeding pawls; Fig. 71 is a detail perspective view of the belt shifting cam disk; and Fig. 72 is a detail view of one of the levers employed with the yarn changers.

In the embodiment illustrated, 1 denotes the frame of a knitting machine which may be of any desired construction but is preferably of the type shown in the patents to Hemphill, Numbers 933,443, dated September 7, 1909, and 934,969, dated September 21, 1909. Journaled in this frame is a main drive shaft 2, carrying what will be termed fast, slow and loose pulleys 3, 4 and 5, respectively, for a purpose to be hereinafter described, and on which the belt is adapted to be shifted automatically to vary the speed of the machine for the knitting of the different parts of the hose; for instance, it is desirable that the machine operate rapidly when forming the tubular leg and foot of the stocking and slow when reciprocating to form the heel and toe and when passing from the leg to the heel and from the foot to the toe. A handle 6 is arranged at the outer end of this shaft 2 and a bevel gear 7 is mounted on its inner end and adapted to mesh with a similar gear 7' connected to operate the needle cylinder, (see Figs. 1 and 34). A clutch member 8 is keyed to slide on the shaft 2 and is provided with a groove 9 in its periphery for engagement by an operating or shifting member hereinafter described. This clutch is adapted to be moved either to the right or to the left to cause it to engage certain gears when certain parts to be described are operating. A gear 10 is mounted on the shaft 2 and has a sleeve 11 at its outer end extending to a sleeve 11 at its outer end extending to the outer end of said shaft 2 and on which the fast pulley 3 is revolubly mounted. The hub of this gear 10 also has a clutch member 10' on its inner face for engagement with the sliding clutch 8 for a purpose to be described.

The slow pulley 4 is mounted on the sleeve 11 and has a sleeve 12 extending to the end of the shaft 2 on which the loose pulley 5 rotates. The sleeves 11 and 12 of the gear 10 and pulley 4 are fixed together by means of a key 6' formed integral with the handle 6, said handle being secured to the sleeve 11 of gear 10 preferably by means of pins as 6'' as is clearly shown in Fig. 34.

A gear 13 is made integral with the fast pulley 3 and is adapted to mesh with a pinion 14 carried by a stub shaft 15 mounted in suitable bearings in the frame 1 and having a larger gear 16 at its other end which meshes with the gear 10 on the shaft 2. A gear 17 is loosely mounted on the shaft 2 and is provided on its inner face with a clutch member 17' for engagement by the clutch 8 and is designed for a purpose hereinafter described.

A driving belt 18 is designed to operate on any one of the pulleys above referred to and a belt shifter 19 is connected to the frame and adapted to operate automatically to shift the belt onto the desired pulley. The free end of this shifter 19 extends into the path of an operating cam disk 20 which is shown in detail in Fig. 71 and which will be hereinafter further described. This belt shifting member 19 (see Fig. 1) has a lateral outwardly extending arm 19'' provided with longitudinally spaced pins 19$^a$ which normally engage the belt 18 and when the shifter member 19 is moved outward or inward the desired distance by the cam disk 20 it carries the belt with it and shifts it to the desired pulley. This member 19 also has a lateral inwardly extending arm 19$^b$ provided with a lug 19$^c$ designed to engage the frame 1 to limit the outward swing of the shifter member 19. This arm 19$^b$ is also provided in its upper face with a notch or recess 19$^d$ adapted to be engaged by a pawl 19$^e$ for locking the shifter in position to hold the belt on the loose pulley 5. An arm 19$^f$ extends inwardly from the member 19 through suitable bearings of the frame 1 and has a collar 19$^g$ fixed thereto between which and the frame on said arm is a coiled spring 19$^h$ designed to hold the free end of the member 19 yieldably in engagement with the operating cam disk 20. This belt shifter cam disk 20 which is fixed to one end of a shaft 90 and is shown in detail in Fig. 71 is provided on one face thereof with laterally extending cams 20ª, 20ᶜ and 20ᵉ with spaces 20ᵇ, 20ᵈ and 20ᶠ formed between them and the free lower end 19' of the belt shifter lever 19 extends into the path of this cam disk and is operated by said cams to move the lever and shift the belt in the manner now to be described. When the machine is operating to knit the leg of a stocking, the belt 18 is in position on the fast pulley 3 and the end 19' of the shifter lever 19 engages the flat face of the disk 20 in the space 20ᶠ between cams 20ᵉ and 20ª (see Fig. 71). When the leg has been completed and the parts to be described have been actuated to throw the machine on the heel the cam disk 20 is turned with the shaft 90 to cause the end 19' to ride up the incline 20ª of the cam 20 into contact with its outer face or edge whereby the shifter member 19 is moved outwardly carrying the belt with it and shifting it onto the slow pulley 4 in which position it remains during the knitting of the heel. When the machine passes from the heel to the foot the disk 20 is turned sufficiently to cause the lever end 19' to drop off the cam 20ª into the space 20ᵇ which moves the shifter 19 inwardly a sufficient distance to shift the belt onto the fast pulley 3 again where it remains during the knitting of the foot. The machine is then thrown onto the toe and the end 19' moves up the incline 20ʰ of the cam 20ᶜ into engagement with the face of said cam thereby moving the shifter 19 outward again and transferring the belt to the slow pulley 4 where it remains until the toe is completed when the further turning of the disk 20 causes the end 19' to drop off cam 20ᶜ into the recess 20ᵈ to again shift the belt to the fast pulley 3 to form the several waste courses known in the art as the "looper's rounds." When these courses are finished, the further turning of the disk causes the lever end 19' to move up the long cam face 20ᵉ which moves the lever 19 outward to its extreme limit and shifts the belt onto the loose pulley 5 and the machine is thrown out of operation.

A clutch operating lever 157 constructed as shown in Fig. 4 comprises a tubular member or sleeve 157ª mounted to oscillate on a rod or shaft 157ᵇ suitably supported in the housing or frame $f$. An upwardly extending arm 157ᶜ has a forked member 157ᵈ arranged in the free end thereof and said member projects into the groove 9 of the clutch member 8 and operates to shift said clutch 8 to the right or left on the rocking or oscillating of the member 157. This sleeve 157ª also has an arm 157ᵉ extending downwardly therefrom and which is preferably curved toward the front and is provided with an upright pin 157ᶠ adjustably secured therein by a set screw 157ᵍ. The lower end of this pin or tooth is beveled and is adapted to extend into the path of a cam disk 155 hereinafter described and be operated thereby to rock or oscillate the member 157ª and shift the clutch 8.

A depending bracket 21 (see Figs. 1, 3, 7 and 8) is mounted on the base plate 1' of the frame 2 and is similar in construction to that shown in my pending application filed Oct. 12, 1908, Serial No. 457,380. A large gear wheel 22 is journaled on a stud held in said bracket 21 and carries a pattern ring 23, which latter ring will be hereinafter described in detail. The pattern ring 23 (see Fig. 3) is removably mounted on the free side of the gear 22 preferably by means of screws and this ring is preferably provided with an aperture adapted to engage a pin mounted on the wheel 22. It will thus be evident that the pattern ring may be readily removed from the gear wheel 22 and a ring bearing a different pattern substituted therefor when desired. This pattern which is here shown in the form of an annulus (see Figs. 3 and 10) is provided on its periphery with a plurality of notches or recesses of different lengths and depths which are adapted to control the ordinary yarn changing controllers which latter will not be described in detail as they form no part of the present invention. These recesses are formed in as many depths as there are colors of yarn to be used, three being shown in the present instance. The pattern can be quickly changed by removing one ring 23 and substituting another and said rings may be provided with any suitable distinguishing marks by which they may be known. The first notch or recess shown in the periphery $a$ of the pattern ring herein illustrated is designated as $b$, the second notch as $c$ and the third notch as $d$. These notches or recesses are designed to be engaged by a pin or stud 24 connected with a lever 25 (see Figs. 3, 12 and 13) which is fulcrumed near its lower end at 26 on a bracket 27 bolted to the lower face of the base plate 2' of the frame 1. This pin 24 is preferably detachably mounted in a block 28 (see Fig. 17) which is suitably mounted at the free end of an extension 27' of bracket 27, it being preferably held by a plate 28ª secured by screws as 28ᵇ. A stud 29 is screwed into block 28 and extends into a slot 25ª arranged in a block 25ᵇ mounted in an opening 25ᶜ in the lower end of the lever 25. This block 25ª is adjustably held by screws as 25ᵈ which pass through the end of the lever 25. These screws are held against movement by jam nuts 25ᵉ. The upper end of this lever 25 (see Figs. 3, 12 and 14) has an inclined guide or raceway 30 designed to receive a sliding roller 81 which will be hereinafter described. A laterally extending lug 31 projects from the outer edge of said lever 25 at a point below the guide 30 with a space formed between them in which a member 78 hereinafter described is designed to operate. The upper face of this lug 31 is inclined as shown at 31' and a pin 31ª extends laterally from one face thereof and is adapted for a purpose to be described. The pattern ring 23 is also provided in its periphery with spaced notches 32 and 33 much deeper than the notches $b$, $c$ and $d$ and are designed to receive the pin 24 at predetermined intervals to throw into operation certain yarn changers to provide for the formation of the tip of the toe and heel in a different colored yarn. This pattern ring 23 is also provided on one face thereof with a long arc-shaped cam 34 and with cams 35 and 36 arranged at proper distances on said ring to throw into operation certain mechanism hereinafter described. These cams 35 and 36 are provided on their upper faces near one end with raised portions or lugs 35' and 36' for a purpose to be described. Two removable headed studs or screws 37 and 38 are also arranged on the cam ring and are adapted to operate certain mechanism hereinafter described for forming extra courses such as are used in making full length hose. The heads of these studs extend in a plane beyond the cams on the ring to permit the member which is operated by the cams to ride thereunder without being actuated thereby.

A shaft 51 is mounted in a bracket 21ª bolted to the lower face of the base plate 2' and in an apertured ear 21ᵇ extending laterally from the bracket 21. (See Figs. 1, 3 and 25.) A pinion 39 is fixed to the shaft 51 at one end thereof and is arranged to mesh with and drive the gear 22 which carries the pattern ring 23. A ratchet wheel 50 is removably secured to the other end of the shaft 51 preferably by a key 52 to provide for its ready removal and the substitution of another wheel having a different number of teeth when it is desired to change the size of the stocking to be knit.

A guard 53 made in the form of a disk having a recess 54 in its periphery (see Fig. 24) is made integral with one end of a sleeve 55 which encircles the shaft 51 and said guard is arranged adjacent the inner face of the ratchet 50 the periphery of said disk extending slightly beyond the teeth of the ratchet wheel 50 and is designed to hold the ratchet actuating pawl out of engagement with the teeth of said ratchet wheel, at predetermined intervals as will be hereinafter described. This sleeve 55 is preferably made in two sections (see Fig. 25) having a clutch-like connection to provide for the ready assembling of the parts. A collar 56 is mounted on the sleeve 55 and has an arm 57 extending laterally therefrom. A spring 58 is coiled around the sleeve 55 between the bracket 21ª and said collar and has one end secured to said bracket and the other end engaged with said arm 57 and has a tendency to force said arm normally downward. An arm 58' has one end engaged with said sleeve 55 for a purpose to be described.

A pawl 41 for actuating the ratchet wheel 50 is fixed to the outer end of a stub shaft 41ª which extends laterally from the lower end of a pitman 40 and the other end of the arm 58' is also engaged with said tub shaft between the pawl 41 and the pitman (see Figs. 18 and 20). A spring 49 is connected at one end to the free end of the pawl 41 and at its other end to said link 40ª to hold said pawl yieldably in engagement with the ratchet wheel 50. The pitman 40 carries near its lower end a stud 40ᵇ (see Figs. 18 and 19) and the upper end thereof is pivoted eccentrically to the gear wheel 7 on the driving shaft 2, the stud forming a pivot for a lever to be described. This pawl 41 is preferably made adjustable to provide for wear thereof and as shown in Figs. 18 and 23 comprises a stem or shank 42 having an elongated slot 43 therein through which the bolt 44 passes to connect the head 45 of the pawl therewith. This head 45 is preferably made bifurcated as shown in Fig. 22 with the shank 42 extending between the arms of the forked end and these arms are provided with bolt apertures registering with the slot 43 to receive the bolt 44. A screw 46 is engaged with the free end of the stem 42 and has an enlarged head 47 which extends over and engages the upper faces of the arms of the forked end of the head 45 to hold the head and stem firmly together and prevent pivotal movement of one relative to the other. A set screw 48 extends through the end of the head 43 and engages the shank of the screw 46 to lock it against turning. The recess 54 (see Fig. 24) formed in the periphery of the guard disk 53 permits the toe of the pawl 41 to normally drop therein in position to engage and operate the ratchet wheel 50 whereby the pattern ring is actuated. The head of the pawl 41 as shown clearly in Fig. 2 is made sufficiently wide to span the periphery of both the ratchet wheel 50 and guard disk 53 and operates said ratchet wheel only when the toe thereof rests in the recess 54. When it is desired to throw the pattern wheel out of operation, the unnotched portion of the periphery of the guard disk is caused to pass under the toe of the pawl 41 and raise it out of engagement with the teeth of the ratchet wheel 50, by means now to be described.

The guard 53 which elevates the toe of the pawl 41 is actuated by the following mechanism; to wit, the arm 57 which extends laterally from the sleeve 55 of the ratchet guard 53 has an upright arm 58' pivotally connected at its lower end with the outer end of said arm 57 and at its upper end with the free end of a horizontal bar 59 the other end of which is made integral with a shaft 60 journaled on suitable bearings 61 and 61ᵃ in the frame 1 (see Figs. 2 and 69). Another arm 62 made integral with the opposite end of the rock shaft 60 extends forwardly therefrom and is provided at its free end with two rollers 63 and 64 arranged on opposite sides thereof. These rollers 63 and 64 are arranged in position to be engaged by certain cams 102 and 96 hereinafter to be described whereby the arm 62 is depressed the shaft 60 rocked on its bearing and the motion is transmitted through the bar 59, arm 58', and arm 57 to turn the sleeve 55' of guard 53 and turn said guard to cause its periphery to engage the toe of the pawl 41 and disengage it from the ratchet teeth of the wheel 50 and thereby throw the pattern ring out of operation. The bearings 61 and 61ᵃ for the shaft 60 are preferably made in the form shown having pointed ends engaging sockets in the end of the shaft 60. The member 61ᵃ is preferably made in the form of a screw to adapt it to be adjusted to provide for wear of the parts. The member 61 is constructed in the form of a pointed stud having one end mounted in the housing and with a flange 61ᵇ arranged near its pointed end to provide a space between said flange and the housing to permit an extra course operating lever 126 to be pivotally mounted on said stud at this point.

The yarn changing mechanism for stripping the leg and foot which is actuated by the pin 24 engaging the various recesses $b$, $c$ and $d$ in the periphery of the pattern ring 23, as shown, comprises three actuator levers 65, 66 and 67 shown in detail in Figs. 26, 27, 28, 29, 30 and 31. These levers are provided with laterally extending pins as 65ᵃ, 66ᵃ and 67ᵃ, respectively, the free ends of which lie in the same vertical plane and are designed to be engaged by an operating arm hereinafter described which is disposed to engage one of said pins on each actuation thereof whereby the upwardly extending nose or lug at the free end of the lever or finger so moved passes out of engagement with the inclined face 68ᵃ formed on one end of an approximately arc-shaped member 68, one of which is arranged above each thread changer actuator lever and is pivoted intermediately of its ends. The other ends of said members 68 are connected with wires as 69 for actuating the yarn changers with which they are connected. The free outer ends of these members 68 which are provided with the downwardly inclined lower faces are adapted for engagement by the lugs on the thread changer actuator levers whereby said ends are tilted upwardly to lower their other ends and throw the yarn changers with which they are connected out of operation. Each of these yarn changer actuator levers is of the same general shape, the upwardly extending lugs 65ᵇ and 66ᵇ being of different lengths and the lengths of the long arms of said levers being also different to provide free spaces for the studs 65ᵃ and 66ᵃ and 67ᵃ in different planes vertically spaced one above the other. These levers are loosely mounted on a shaft 90 and are each provided with a laterally extending apertured ear, as 70 with which a coiled spring as 71 is connected at one end and at its other end with an ear as 72 on the frame 1, to exert a forward pull on its lever and cause its free upper end to ride forward under the outer end of its member 68 into engagement with the inclined face 68ᵃ of said member to throw and hold its respective yarn changer out of operation. These levers are also each provided with hook-like noses as 73, at their lower pivoted ends, which are adapted to be successively engaged with a pawl on the spring pressed trip member or trigger 74, pivotally mounted on the frame 1 (see Figs. 3, 26, 32 and 32ᵃ), adapted to hold them in operative position for operating their respective yarn changers. This member 74 is preferably constructed as shown in detail in Figs. 32 and 32ᵃ, with a stud 75 extending laterally from one side edge for engagement by a member hereinafter described to disengage it from the nose of the lever which is left in engagement with said trigger member on the completion of the stocking. This member 74 is pivotally mounted on a stub shaft 74ᵃ secured to the housing and is yieldably held in operative position by means of a coiled spring 74ᵇ engaged at one end with an apertured ear 74ᶜ which extends rearwardly from said member 74 and at its other end is connected to the housing and the upper face of its free or tripping extremity is beveled for a purpose to be described.

The laterally extending beveled stud 75 on the retaining pawl or trigger 74 is designed to be engaged by a stud 155' on the cam disk 155 for tilting the pawl 74 downward and disengaging it from the nose of the finger or thread changer actuator lever which is last in operation whereby all of the yarn changer controllers are thrown out of operation. It is, however, necessary that the movement of these thread changer levers shall not be independent of each other, but that they shall be so connected that the depression of any one of the thread changers to operative position to feed yarn necessarily brings about the raising of any other one which has been previously depressed but not until after the incoming thread changer has reached its operative position. This is effected by the trigger 74 as follows: The tripping extremity of the trigger 74 having the beveled upper face is so related to that of the noses 73 of the thread changer actuator levers that when any one of them is moved to depress its thread changer, its nose 73 presses against the beveled surface of the trigger pushing it against the spring 74$^b$ until the hook portion thereof is disengaged from the nose of the lever already in engagement therewith which is released and under the tension of its spring 71 moves its thread changer into inoperative position and the nose of the lever being moved is engaged with the hook of the trigger and fixed in this position until the trigger is again moved.

A bar 75$^a$ (see Figs. 3, 26 and 33) is fastened at one end to the housing and extends in a plane below the apertured ears 70 of the levers 65, 66 and 67 and is provided with three vertically adjustable pins 75$^b$, 75$^c$ and 75$^d$ arranged respectively in the paths of the ears as 70 of the three levers to form stops for limiting the forward movement of said levers. Set screws as 75$^e$ extend through said bar 75$^a$ and engage the respective pins to hold them in adjusted position. The means for operating these levers 65, 66 and 67 shown in Figs. 3, 63, 64, 65, comprises an obtuse angled lever 76 fulcrumed at 76$^a$ to the housing and having one end slotted longitudinally and pivotally connected with the stud 40$^b$ on pitman 40 (see Fig. 3) and the free end of the lever 76 has a lateral extension 77$^a$ provided with a roller 78 designed to engage the cam shaped recess formed between the inclined race-way 30 and the lug 31 of the lever 25. An upright bar or link 79 is pivotally connected to the free end of the extension 77$^a$ of the bar 77 adjacent the roller 78 and is provided on its end with an upwardly inclined arm or finger 80 which is adapted to operate in the path of the pins of the levers 65, 66 and 67 for throwing them into position to operate their respective yarn changers. A roller 81 is mounted on the upright bar 79 preferably at a point adjacent its inclined finger 80 and this roller is designed to operate in the inclined race-way 30 of the free end of the lever 25 which carries the pin 24 at its other end for engaging the recesses in the periphery of the pattern ring. A spring 25' is arranged to bear against the lever 25 to force it normally outward away from the frame 1 to cause the pin 24 to yieldably engage the periphery of the pattern ring. When the pin 24 drops into one of the recesses $b$ and $c$ or $d$ of the pattern ring, the free end of the lever 25 carrying the raceway 30 is moved downwardly and held stationary to so position the raceway 30 that the motion upwardly of the link 79 and roller 81 due to its connection with the pitman 40 will cause the finger 80 to be projected inwardly in a path determined by the position of the raceway 30 and the finger 80 will collide with one of the pins 67$^a$ 66$^a$ or 65$^a$ to actuate the selected yarn changer.

The deepest notch in the pattern wheel will position the raceway 30 so as to cause the pin 67$^a$ and lever 67 to be moved while the shallowest notch will effect moving of the lever 65, but the periphery of the pattern will cause the finger 80 to take a path too low to actuate any of the pins. The downward motion of the lever 76, rollers 78 and 81 retracts outwardly the finger 80 and through the roller 78 acting on the cam lug 31 near the end of its downward motion lifts the pin 24 from the periphery of the pattern wheel which now can be again advanced. The yarn last selected will remain in operation until another notch in the pattern wheel comes under the pin 24 the motion of the finger 80 being on the lower path and out of engagement with the pins and the yarn changer actuator levers so long as the pin 24 rides on the periphery of the wheel.

A segmental gear 82 is carried at the free end of one arm of a bell crank lever 83 which is fulcrumed at 84 to the frame 1 and this gear 82 meshes with the pinion 17 on the shaft 2. The free end of the other arm of said lever 83 is pivotally connected with a pitman 85 connected with a gear 86 which meshes with and is operated by the pinion 10 (see Fig. 4). This pitman 85 operates the bell crank lever 83 and rocks it back and forth for a purpose to be described.

Three pawls 87, 88 and 89 are pivotally mounted on a laterally extending stub shaft 83' carried by the upright arm of the bell crank lever 83 and these pawls are designed to operate under certain circumstances ratchets driving the controlling cams on the shaft 90. The pawl 87 has an arm 87' extending upwardly therefrom which is designed to be engaged by a yieldable member hereinafter described. Three toothed wheels 91, 92 and 93 are mounted adjacent to each other on the shaft 90 which is journaled in the frame 1 and on which the clutch operating disk or drum 155, the belt shifting cam disk 20, the picker operating cam disk, and the levers 65, 66 and 67 are all mounted, two of said toothed wheels 91 and 93 and the three levers 65, 66 and 67 being revolubly mounted on said shaft and the other toothed wheel 92, the clutch operating cam disk 155, the belt shifter disk 20 and the picker operating disk being fixed to the shaft by any suitable means and adapted to be turned with said shaft as will be hereinafter described.

A spring 87$^b$ is coiled around the hub of the pawl 87 and has one end attached to a screw 87$^c$ which extends through the lever 83 and fastens said stub shaft 83' firmly in place. The other end of this spring 87$^b$ bears on the upper face of the shank of the pawl 87 and holds it yieldably in operative position to insure a positive engagement of said pawl with the teeth of the wheel 92. The other pawls 88 and 89 operate by gravity as they are longer than pawl 87 and require no spring. The toe of pawl 87 is made sufficiently wide to provide for its spanning the periphery of wheel 92 and an L-shaped lever 142 now to be described. The upright short arm 142ª of this lever has a laterally extending tubular member 142ᵇ which is pivotally mounted on a bolt or stub shaft 143 extending inwardly from the housing and a pin 142ᶜ holds said lever in position on said shaft. The free end of the short upright arm 142ª is provided with a rod 144 extending laterally in the same direction as the horizontally disposed long arm 142ᵈ. The free end of the rod 144 operates piston-like in a cylinder 145 having a cushioning spring 146 arranged in said cylinder between the free enlarged end of the rod 144 and the closed outer end of the cylinder, the cylinder being movable on the rod 144. This yielding cylinder is adapted to be engaged by the upright arm 87' of the pawl 87 and is made yieldable to prevent breakage of the parts when they come in contact. A finger 147 extends from the short arm of the lever 142 in position to engage a pin 91ᵇ on the ratchet wheel 91 to act as a safety guard for holding the lever 142 under the pawl 87 and prevent its engagement with the teeth of the wheel 92 until the proper mechanisms have been operated. When the pawl 87 swings forward the upright arm 87' thereof engages the cylinder 145 and swings the lever 142 on its fulcrum and lifts the free end of its long arm out of engagement with the head 138 of lever 136 and permits said lever under the action of its spring 137 to swing back into position ready for the next operation.

The ratchet wheel 91 which is revoluble on the shaft 90 is provided on its periphery with the usual ratchet teeth of uniform size having one tooth 91' longer than the rest, and a block 94 secured to the casing or frame 1 has a laterally extending inclined portion 95 arranged adjacent the periphery of said ratchet wheel 91 and practically forms a continuation of the long tooth 91' and on which the pawl 88 is designed to reciprocate back and forth.

A cam 96 is fixed to the hub of the ratchet wheel 91 on its front or outer face and is preferably made in the form of a disk having a recess 97 formed in the periphery thereof, and against the periphery of which the roller 64 above described is designed to bear. This ratchet wheel 91 is provided on its front or outer face with a plurality of laterally extending studs of varying sizes, four being herein shown and numbered 98, 99, 100 and 101, for a purpose to be described. A spring 130 is arranged to engage and hold said wheel 91 against backward movement. A comparatively small toothed wheel 93 is also revoluble on the shaft 90. The teeth of this wheel 93 are designed to be engaged by the pawl 89 when the extra courses are to be formed for making a longer foot or leg for a stocking as above referred to and as will be hereinafter described. A cam 102 (shown in Figs. 5, 10 and 12) is secured to the hub of this wheel 93 adjacent its inner face and is adapted to be engaged by the roller 63 hereinbefore described and the rotation of wheel 93 by pawl 89 causes said cam 102 to depress the lever 62 which operates through shaft 60, arm 59, link or arm 58', and arm 57 to turn the guard 53 under pawl 41 and thus throw the pattern wheel out of operation. (See Figs. 2, 5 and 69.) The pawl 89 is held normally out of engagement with the teeth of wheel 93 by means of a lever 126, the free end of which is arranged in the path of said pawl 89 to permit it to rock back and forth thereon without engaging the teeth of said wheel 93, until said lever 126 is depressed by a certain actuating mechanism to be described, when it is desired to have the pawl 89 operate the wheel 93 for knitting the extra courses. A small spring pressed pawl 129 is arranged to engage the teeth of the wheel 93 and hold it against backward movement.

The wheel 92 is provided on its periphery with a plurality of teeth of varying sizes, eighteen being here shown and which are designated as 103, 104, 105, 106, 107, 108, 109, 110, 111, 112, 113, 114, 115, 116, 117, 118, 119, and 120, (see Fig. 47,) the purpose of which will be hereinafter described.

Mounted on one face of the ratchet wheel 92 are two flat springs 121 and 122 which are secured at one end to the wheel and have beveled teeth 123 and 124 at their free ends which extend through apertures in said wheel and the ends thereof project beyond the opposite face of the wheel and are designed to engage a stud 91ª on the adjacent face of the wheel 91 for a purpose to be described.

Two members 131 and 132 operated by the cams and headed studs on the pattern ring are mounted to move vertically through the base plate 2' and a guide block 2'' bolted to said base plate. These members which are similar in construction and are shown clearly in Figs. 35, 36, and 42 are made in the form of rods having lugs 131ª and 132ª extending laterally from the lower ends thereof with the lower faces of said lugs inclined downwardly forming dogs or pawls at the lower ends of said rods. The upper ends of the rods are cut away on one face to form flat lever engaging surfaces to prevent the turning of said rods relative to the levers with which they are connected. The rods are provided near their cut out upper ends with laterally extending stops, preferably made in the form of pins 131$^b$ and 132$^b$ passed through said rods and designed to engage the upper face of the block 2″ for limiting the downward movement of said members. The cut out upper end of rod 131 is connected with one end of a bar or lever 134, fulcrumed at 135, by means of a headed stud 131$^c$ the stem or shank of which extends through a longitudinally extending slot 134$^a$ at one end of the lever 134 and through the upper end of the rod 131, the slot providing for the tilting of said lever as will be hereinafter described. This stud 131$^c$ has an annular flange 131$^d$ arranged adjacent the head thereof which bears against the outer face of the lever end. The head of the stud 131$^c$ projects into the path of one end of a vertically swinging lever 149 and by means of which the lever 134 is tilted as will be described. An upright bar 136 having an off-set formed therein extends upwardly at right angles from and is made integral with the lever 134 and together they form an inverted T-shaped member. This upright bar is yieldably connected with the housing by means of a coiled pull spring 137 and which holds it and the lever 134 in the tilted position shown in Fig. 35 and returns it to this position after it has been moved in the opposite direction by means to be described. The upper end of this upright bar 136 has a stepped head 138 three steps 139, 140 and 141 being shown, the top or outer end 142′ forming another. These steps are adapted to be engaged by the free end of the long arm of the substantially L-shaped lever 142 (shown in Figs. 57 and 58).

The horizontally disposed lever 149 hereinbefore referred to is pivoted intermediately of its ends to a post 150 projecting upwardly from the base plate 2′, and one end thereof extends under the head of the stud 131$^c$ and an L-shaped lug 151 extends laterally from its other end with the free arm thereof extending upwardly and having its terminal inclined on its upper face as is clearly shown in Figs. 5 and 38. This inclined arm at the end of lever 149 is arranged in the path of the studs carried by the ratchet wheel 91 and is adapted to be operated by said studs for tilting the lever 136 and is engaged by said studs on the rotation of the ratchet wheel 92 whereby the lever 142 is caused to drop a distance measured by the step on the lever 136 brought under it to permit the pawl 87 to engage the desired tooth on the ratchet wheel 92 as will be hereinafter more fully described.

The rod 132 has a lateral stud 132$^c$ on the flat face of its upper end which extends through an elongated slot 133$^a$ near one end of a lever 133 which end is arranged to engage the lever 126 to depress the free end thereof out of the path of the pawl 89 to permit said pawl to operate the wheel 93 for forming the extra courses and this rod 132 is actuated by the removable headed studs 37 and 38 carried by the pattern and when the head of one of these studs is brought into the path of the pawl end of the rod 132, said rod is raised thereby lifting the end of the lever 133 which bears against the lower face of the lever 126 and thereby raising said end and depressing the other curved end thus removing it out of the path of the pawl 89 and permitting said pawl to engage the teeth of the wheel 93. The rotation of this wheel 93 brings the cam 102 thereof under the roller 63 on the lever 62 and depresses said roller carried end which operates through the shaft 60, arm 59, link 58′ and arm 57, to turn the guard 53 under the pawl 41 and thus throw the pattern wheel out of operation. The pawl 89 continues to turn the wheel 93 and the knitting of the extra courses are knit until the cam 102 has been turned sufficiently to permit the roller 63 to run off the other end thereof which operates through the lever 62 and the links and arms connected therewith to turn the guard from under the pawl 41 to again throw the pattern ring into operation. On the rotation of the pattern ring the stud moves out of engagement with the pawl 132 and it is forced down by the pressure of the lever 126 on the lever 133 under the tension of the spring 128 and which also elevates the curved end of said lever 126 into the path of the pawl 89 whereby the knitting of the extra courses is stopped.

The lever 126 is pivoted at 127 to the bearing or stud 61 (see Fig. 2) and has a beveled pawl-like nose 126$^a$ at its upper free end which normally lies in the path of the pawl 89 and holds it out of engagement with the teeth of wheel 93 until said nose is depressed by the lever 133 forcing its other end upward, when the pawl 89 will drop into engagement with the teeth and turn the wheel 93. A curved spring 128 has one end secured at 128$^a$ to the side of the housing and the other end thereof is engaged with the free lower end of lever 126 and is designed to hold the beveled upper end of said lever normally in the path of pawl 89 and also to limit the downward movement of said lever. The levers 133 and 134 are preferably pivotally mounted in a block 152 which is fastened to the base plate 2′ in any suitable manner and is provided in its upper end with spaced recesses or slots 153 and 154 in which said levers 134 and 133 are pivoted as is shown in Figs. 35, 37 and 41 by a bolt 135.

A cam disk or drum 155 is fixed to the shaft 90 and is provided with suitable laterally extending cams as 156 which are adapted to engage the pin 157$^d$ of the clutch operating lever 157 to rock said lever and shift the clutch 8 into engagement with the pinions 10 and 17, respectively, when desired, and which will be more fully brought out in the description of the operation of the machine, (see Figs. 1 and 4.)

A needle elevating switch cam operating lever 158 is fulcrumed at 159 to a stub shaft 160 secured to the frame 1 and the free end of this lever projects into the path of the laterally extending cams as 161 and 161' carried by the drum or cam disk 155 which are designed to operate the needle elevating switch cam for raising and lowering the needles during the formation of the heel and toe as will be hereinafter more fully described in the description of the operation of the machine. This lever 158 is constructed in the form shown in Figs. 55 and 56 and a link 162 is pivotally connected at one end with the lever 158 and at its other end to a bell crank lever 163 which is fulcrumed at 164 to a stub shaft 165 which extends laterally from the frame 1 and a spring 166 is connected at one end to the long upright arm of the lever 163 and at its other end to the frame 1 and is designed to hold the free end of the lever 158 in engagement with the cams of the cam disk 155. A link 167 is pivotally connected with the free end of the long upwardly extending arm of the lever 163 and at its other end with a bell crank lever 168 connected with a needle elevating switch cam.

Secured to the shaft 90 at the opposite end thereof from the belt shifting cam disk 20 is a cam disk 180 by which the picker operating lever 181 is actuated (see Fig. 1), and which is connected to operate the pickers in a well known manner such as is shown in the Hemphill patents, Numbers 933,443, dated September 7, 1909, and 934,969, dated September 21, 1909. This cam disk 180 is constructed as shown in Figs. 66 and 67 and the picker operating lever, the toe 182 of which extends into the path of the cams on said disk 180, is constructed as shown in detail in Fig. 68.

When it is desired to knit a different colored tip for the heel and toe, (see Figs. 1, 60 and 61,) a threaded pin 173 is adjusted in the upturned end of lever 170 in position to come in the path of the stud 31$^a$ on the depression of the end 172 by one of the studs 155$^a$ or 155$^b$ on the cam drum to limit the depth the pin 24 may extend into the recess 32 or 33 in the pattern ring 23 and thus control the outward swing of the raceway 30 thereby operating the proper finger for throwing into operation the desired yarn changer for supplying the color desired for the tip. A spring 171 is connected with the lever 170 and the housing, to return said lever to normal position after it is operated. When it is desired to have the tip of the same color as the heel or toe, the screw pin 173 is adjusted to its extreme inward limit for holding the lever 25 against movement when the pin 24 passes over the recess 32 or 33 in the periphery of the ring 23. A jam nut 173$^a$ is arranged to hold the pin 173 in adjusted position. The lever 170 has a lug or projection 174 adapted to engage a stop in the form of a lug 191 on the bracket 190 for limiting the inward movement of said lever.

It is to be understood that during the formation of the leg and foot, the needle cylinder rotates and when forming the heel and toe it reciprocates one half of the needles only being in operation, during the knitting of the heel and toe.

In the operation of this machine, the parts of which are shown at their starting or initial position for beginning the knitting of the leg, see particularly Figs. 1, 2, 3, 5 and 35, the driving belt 18 is operating on the fast pulley 3 (as shown in Fig. 1) and the clutch 8 is engaged with the clutch member 10' of the gear 10 to provide for the rapid rotation of the needle cylinder. The pawl rod 131 rests on the long arc-shaped cam 34 about midway thereof with the stud of pin 131$^a$ resting on the guide block, as shown in Figs. 3, 4 and 35, with the end of the pawl or lever 142 resting on or engaging the step 140 of the head 138 of the upright tilting lever 136 and the oscillating pawl 87 engages what are herein termed the idle teeth 103, 104 and 105 of wheel 92, said wheel during the actuation of these teeth being idle or in other words operating no mechanism. As the knitting of the leg proceeds the cam 34 on the pattern ring 23 moves from under the pawl rod 131 and said rod is held in this position by its pin 131$^a$ resting on the guide block, the lever 136 having been tilted to bring the extreme end or step 142' of the head 138 in engagement with the lever 142 bringing said lever 142 under said pawl 87 and thereby throwing the actuating wheel out of operation. As the pattern ring rotates the various yarn changers are operated to produce the various predetermined stripes by the pin 24 under the point of which the periphery of the pattern ring 23 moves. For instance, when a certain notch or recess in the periphery of said ring comes opposite the pin 24, said pin drops thereinto and the upper free end of the lever 25 is moved outward into position to guide the finger 80 into engagement with a pin of one of the yarn changer operating fingers, whereby the upper end of said finger is moved backward to bring its toe 73 into engagement with the pawl member 74, thus relieving the free end of lever 68 from engagement with the lug at the upper end of said finger and releasing the tension of the wire which connects said lever 68 with its respective yarn changer and permitting the spring of said yarn changer to throw it into operation. At the same time the roller 78 engages lever 25 and lifts the pin 24 out of the notch and the yarn thrown in continues in operation until the pin 24 again drops into a notch of different depth in the periphery of the pattern ring, when the above described operation is repeated, the finger 80, however, engaging the pin of a different finger for throwing in another yarn. The cam 36 on ring 23 then passes under the pawl rod 131 and tilts lever 316 in position to bring its step 141 into engagement with the lever 142, thereby permitting the pawl 87 to engage the tooth 106 and turn the shaft 90 to bring the slowing-up mechanism into operation preparatory to the throwing of the needles onto the heel. The raised end or lug 36′ of the cam 36 lifts the rod 131 higher and tilts the lever 136 backward to permit the lever 142 to drop onto the lowest step 139 and allows the pawl 87 to engage the tooth 107 which turns the shaft and actuates the mechanism to throw the machine on the heel and simultaneously the cam disk or drum 155 is turned sufficiently to shift the clutch 8 to the left into engagement with the clutch member of the gear 17 for the formation of the heel. At the same time the yielding pin 123 engages the stud 91ª or the inner face of the ratchet wheel 91, whereby a jerking movement is imparted to said wheel 91 turning it sufficiently to permit the pawl 88 to engage the small teeth of said wheel 91 and actuate the wheel. Simultaneously the cam 96 on the hub of the wheel 91 is turned in position to engage the roller 64 on the end of the lever 62 and thereby turns the guard 53 to cause it to raise the toe of pawl 41 out of engagement with the ratchet wheel 50 which actuates the pattern ring and whereby the said pattern wheel remains stationary. The feeding of the cam disks and the toothed wheels is now accomplished by the ratchet wheel 91, it having been brought into position for engagement by the feeding pawl 88 as above described. The stud or screw 98 on the outer face of the ratchet wheel 91 is now brought into engagement with the upper inclined end of arm 151 of the lever 149 and depresses the opposite end thereof which extends under the laterally extending head 148 of the stud which connects the slotted end of the lever or bar 134 with the upper end of the pawl rod 131. This movement of the lever 149 tilts the upright lever 136 and permits the lever 142 to drop onto the step 141 of head 138 and permits the pawl 87 to engage the tooth 108 which turns the shaft 90 a sufficient distance to turn the cam disk 155 to bring the stud 155ª thereof into engagement with the end 172 of the lever 170 for throwing the desired color in to form the heel tip. The stud 99 on the ratchet wheel 91 is now engaged with the arm 151 of lever 149 and tilts the upright lever 136 a sufficient distance to permit the lever 142 to drop onto the step 140 of the head 138 of the lever 136 and permits the pawl 87 to engage the tooth 109 and turns the shaft 90 and the picker operating cam disk 170 to operate the lever 171 to take down a portion of the needles, two needles being drawn down at a time on each reciprocation thus forming the gore in the heel. The small stud 100 next engages the arm 151 of the lever 149 thereby tilting the lever 136 to permit the lever 142 to drop onto the step 141 and allow the pawl 87 to engage the tooth 110 which actuates the mechanism for taking the tip out of the heel. As before stated, during the above described operations, the pattern ring is stationary. The large stud 101 now engages the arm 151 of the lever 149 thereby tilting the upright lever 136 into position to permit the lever 142 to drop onto the step 139 of the head 138 and allow the pawl 87 to engage the tooth 111 thus operating the mechanism to throw the machine off from the heel onto the foot, the clutch 8 having also been shifted from the left to the right to cause it to engage with the member 10′ of the gear 10 to provide for the rapid operation of the needle cylinder during the formation of the foot, it being understood that the belt has been shifted from the slow pulley 4 onto the fast pulley 3 for the formation of the foot. At the same time, the ratchet wheel 91 and the cam 96 carried thereby have made one complete revolution and the roller 64 drops into the notch 97 thereof which, through the arm 62 and the levers connected therewith, turns the cam or guard disk 53 to bring the recess therein opposite the pawl 41 to permit said pawl to again engage the teeth of the ratchet wheel 50 thereby throwing the pattern ring 23 again into operation for the formation of the foot.

After the foot has been completed, the cam 35 comes in contact with the pawl-shaped end of the rod 131 thereby raising said rod and tilting the lever 136 to permit the lever or pawl 142 to drop onto the step 140 and allow the pawl 87 to engage the tooth 112 to operate the mechanism for slowing up the machine. The further movement of the pattern ring 23 causes the upwardly extending lug 35′ thereof to further raise the rod 131 and tilt the lever 136 into position to permit the lever 142 to drop onto the step 139 thereby permitting the pawl 87 to engage the tooth 113 which operates the mechanism for throwing in the needles for knitting the toe, the clutch 8 having been simultaneously shifted from right to left to engage with the gear wheel 17 and the belt is also shifted onto the slow pulley 4 for operation during the formation of the toe. At the end of this stroke of the pawl 87, the yielding stud 92ª comes in contact with the stud 91ª on the ratchet wheel 91, thus allowing the pawl 88 to engage the first small tooth which follows the long tooth 91' of the ratchet wheel 91 and the cam 96 on the outer face of said ratchet wheel 91 again engages the roller 64 and through the levers and links connected therewith turns the guard 53 into the path of the pawl 41 and throws the pattern wheel again out of operation. The pawl 88 is now feeding the ratchet wheel 91 and the stud 98 again engages the arm 151 of the lever 149 thereby depressing it and elevating the lever 136 to permit the feed lever or pawl 142 to drop onto the step 141 and allow the pawl 87 to engage the tooth 113 which operates the mechanism for throwing the mechanism on the toe. The stud 99 on the wheel 91 again comes in contact with the arm 151 of the lever 149 depressing said end and lifting the opposite end of said lever whereby the upright lever 136 is tilted to permit the lever 142 to drop onto the step 141 and the pawl 87 to engage the tooth 114 which operates the mechanism for throwing in the tip of the toe. The stud 100 now comes in contact with the arm 151 of the lever 149 and tilts the lever 136 to permit the pawl or lever 142 to drop onto the step 140 and allow the pawl 87 to engage the tooth 115 of the wheel 92 which operates the mechanism for changing the pickers to draw down a portion of the needles. The small stud 100 now engages the arm 151 of the lever 149 and tilts the upright 136 to permit the pawl 142 to drop onto the step 141 which allows the pawl 87 to engage the tooth 116 which operates the mechanism for taking the tip off the toe. The stud 101 again comes in contact with the arm 151 of the lever 149 and tilts the upright 136 into position to permit the lever 142 to drop onto the step 139 and allows the pawl 87 to engage the tooth 117 which operates the wheel 92 a sufficient distance to actuate the mechanism for throwing the machine off the toe, the clutch being at the same time shifted to the right and simultaneously the cam 96 on the side of the ratchet wheel 91 is turned to cause the roller 64 on the lever 62 to enter the recess 97 in said cam and through said levers 62 and the links and levers connected therewith to turn the guard disk 53 from under the pawl 41 and again start the pattern wheel.

The courses for forming the "loopers rounds" is knit during the turning of the pattern ring from cam 35 to cam 34. The pattern wheel is then rotated to bring the long cam 34 under the pawl-like end of the rod 31 which lifts said rod upward and through it tilts the upright 136 into position to permit the lever 142 to drop onto the step 140 of the head of said member 136 and to allow the pawl 87 to engage the tooth 118 for slowing up the machine. The rod 131 is held up by the long cam 34 so that the next forward movement of the feed pawl 87 engages the tooth 119 which turns the shaft 90 a sufficient distance to cause the free end 19' of the lever 19 to ride upward on the cam face of the disk 20 and shift the belt 18 onto the loose pulley 5 and while the belt is being shifted, sufficient time elapses, cam 34 still holding the rod 131 in raised position, to permit the feed pawl 87 to engage the tooth 120 which operates the mechanism for leveling the needles ready for the operator to transfer another pattern onto said needles and start another stocking.

When it is desired to knit a full length hose or one having an extra long foot the removable headed studs 37 and 38 are inserted at the desired position on the face of the pattern ring which carries the cams and when the head of one of these studs is brought into the path of the pawl end of the rod 132, said rod is raised thereby lifting the end of the lever 133 which bears against the lower face of the lever 126 and thereby raising said end and depressing the other curved end thus removing it out of the path of the pawl 89 and permitting said pawl to engage the teeth of the wheel 93. The rotation of this wheel 93 brings the cam 102 thereof under the roller 63 on the lever 62 and depresses said roller carried end which operates through the shaft 60, arm 59, link 58 and arm 57, to turn the guard 53 under the pawl 41 and thus throw the pattern wheel out of operation. The pawl 89 continues to turn the wheel 93 and the knitting of the extra courses are knit until the cam 102 has been turned sufficiently to permit the roller 63 to run off the other end thereof which operates through the lever 62 and the links and arms connected therewith to turn the guard from under the pawl 41 to again throw the pattern ring into operation. On the rotation of the pattern ring the stud moves out of engagement with the pawl 132 and it is forced down by the pressure of the lever 126 on the lever 133 under the tension of the spring 128 and which also elevates the curved end of said lever 126 into the path of the pawl 89 whereby the knitting of the extra courses is stopped.

I claim as my invention:

1. In a knitting machine, a yarn changing device having movable yarn guides, pivoted members connected to the yarn guides, actuator levers to control the pivoted members, a finger to engage and move the actuator levers, means for actuating said finger, means for controlling the path in which said finger moves comprising a pattern surface, a lever to be positioned by said surface, a cam carried by said lever, and means on the finger controlled by said cam.

2. In a knitting machine, a yarn changing device having movable yarn guides, pivoted members connected to the yarn guides, actuator levers to control the pivoted members, a finger to engage and move the actuator levers, means for moving said finger, means for controlling the path in which said finger moves comprising a pattern surface, a lever to be positioned by said surface, a cam carried by said lever, and a roller on the finger operable on said cam to move said finger into engagement with one of said actuator levers, the path of movement of said roller being determined by the position of the first mentioned lever.

3. In a knitting machine, yarn changing mechanism comprising a pattern surface, means for actuating said surface, a lever positioned by said pattern surface, actuator levers, pivoted members, means on the actuator levers to control the position of the pivoted members, movable yarn guides, connections between said yarn guides and the pivoted members, a finger and means for moving said finger to engage one of said actuator levers in a path determined by the position of the first mentioned lever.

4. In a knitting machine, yarn changing mechanism comprising a pattern surface, means for actuating said surface, actuator levers, pivoted members engaged and moved by said actuator levers, a pawl, and means to select and position one of said actuator levers with respect to said pawl, said means being controlled by said pattern surface, said pawl being operable to release the lever in engagement therewith on the selection of its successor.

5. In a knitting machine the combination of a yarn changing mechanism having movable yarn guides, a pattern surface, a lever fulcrumed intermediately of its ends and having a stud at one end for normal engagement with said pattern surface, arc-shaped members pivoted intermediately of their ends, means for connecting one end of said members with said yarn guides, pivotally mounted yarn changing actuator levers, each having a lateral extension and provided with means for engaging the lower face of the free end of one arc-shaped member, a pawl yieldably engaging one of said actuator levers to hold it in operative position, means controlled by said pattern controlled lever for releasing the actuator lever in engagement with the pawl and for selecting its successor and engaging it with said pawl and means connected with said actuator levers for moving them to inoperative position when released from the pawl.

6. In a knitting machine, the combination of a yarn changer, a pattern therefor, a lever fulcrumed intermediate of its ends having a stud at one end for normal engagement with said pattern, a plurality of individually operable pivotally mounted yarn changer levers each having a laterally extending stud or pin, the free ends of said pins being normally arranged in the same vertical plane and spaced vertically from each other, members connected with the yarn changers and arranged in the path of said levers, and means controlled by said pattern controlled lever for engaging one of said studs to cause its finger to operate one of the yarn changers.

7. In a knitting machine, the combination of a yarn changer, a pattern controlled lever fulcrumed intermediate of its ends and having an adjustable pattern engaging stud at one end and an inclined element at its other end, a laterally extending lug arranged below and spaced from said inclined element, means controlled by said inclined element for operating the yarn changer and means coöperating with said lug for lifting said stud to disengage it from the pattern.

8. A knitting machine comprising in its construction yarn changers, a pattern ring therefor, means for rotating said pattern ring comprising a gear wheel attached to said ring, a pinion mounted to mesh with said wheel, a ratchet wheel connected with said pinion, a pitman, a pawl mounted on said pitman in position to engage and operate said ratchet wheel, a guard disk arranged adjacent said ratchet wheel and extending slightly beyond the periphery thereof, said guard disk having a recess in its periphery, a spring pressed arm connected with said guard disk, an upright link connected with said arm, a rock shaft mounted in suitable bearings and having an arm at one end connected with said link and an arm at the other end provided with a roller, and means operable to depress said roller at predetermined intervals whereby said guard disk is turned in position to engage said pawl and disengage it from the teeth of said ratchet wheel.

9. A knitting machine comprising in its construction yarn changers, a pattern ring therefor, means for rotating said pattern ring comprising a gear wheel attached to said ring, a pinion mounted to mesh with said wheel, a ratchet wheel connected with said pinion, a pitman, a pawl mounted on said pitman in position to engage and operate said ratchet wheel, a guard disk arranged adjacent said ratchet wheel and extending slightly beyond the periphery thereof, said guard disk having a recess in its periphery, a spring pressed arm connected with said guard disk, an upright link connected with said arm, a rock shaft mounted on bearings, one of said bearings being adjustable, an arm extending from said rock shaft and connected with said link and another arm extending in the opposite direction from said shaft and operable to be depressed at predetermined intervals in turning said guard into the path of said pawl for disengaging it from the ratchet wheel and throwing the pattern ring out of operation.

10. A knitting machine comprising in its construction yarn changers, a pattern ring therefor having notches in its periphery, means for rotating said pattern ring, a lever fulcrumed intermediately of its ends and having a pin at one end held yieldably in engagement with the periphery of said pattern ring, an inclined raceway at the other end of said lever, a pitman operated by the driving mechanism of the machine, an obtuse angle lever pivotally connected at one end with said pitman, an upwardly extending link connected with the other end of said lever and having an inwardly inclined finger fixed to the upper end thereof, a roller carried by said link and operable in said inclined raceway, means arranged in the path of said finger in position to be operated thereby for operating the yarn changers, the position of said finger relative to said means being controlled by the position of said inclined raceway and the position of said raceway being controlled by the engagement of the stud at the other end of its lever with the pattern on the periphery of the pattern ring, and means carried by said obtuse angle lever for engaging said pattern controlled lever for lifting the stud thereof out of the notches in the periphery of said pattern ring.

In testimony whereof I have hereunto set my hand in presence of two subscribing witnesses.

HARRY H. WEST.

Witnesses:
W. A. ROBERTS,
ROBT. F. ROBERTS.